US011589323B2

(12) United States Patent
Zhang et al.

(10) Patent No.: US 11,589,323 B2
(45) Date of Patent: Feb. 21, 2023

(54) MINIMUM TIME GAP FOR UPLINK TRANSMISSION IN MULTIPLE TIMING ADVANCE GROUPS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/137,082

(22) Filed: Dec. 29, 2020

(65) Prior Publication Data

US 2021/0243709 A1 Aug. 5, 2021

Related U.S. Application Data

(60) Provisional application No. 62/968,654, filed on Jan. 31, 2020.

(51) Int. Cl.
*H04W 56/00* (2009.01)
*H04L 27/26* (2006.01)

(52) U.S. Cl.
CPC ... *H04W 56/0005* (2013.01); *H04L 27/26025* (2021.01); *H04W 56/0045* (2013.01)

(58) Field of Classification Search
CPC ......... H04W 56/0005; H04W 56/0045; H04W 56/00; H04W 56/001; H04W 56/003; H04W 56/0035; H04W 56/004; H04W 56/0055; H04L 27/26025; H04L 27/2602; H04L 27/2603; H04L 27/26035; H04L 27/2618; H04L 27/2604; H04L 27/2608; H04L 27/261

See application file for complete search history.

(56) References Cited

U.S. PATENT DOCUMENTS

| | | | |
|---|---|---|---|
| 2013/0258958 A1* | 10/2013 | Dinan | H04W 56/0045 370/329 |
| 2013/0272230 A1* | 10/2013 | Dinan | H04L 1/188 370/329 |
| 2015/0139162 A1* | 5/2015 | Dinan | H04L 27/2602 370/329 |
| 2018/0160440 A1* | 6/2018 | Hosseini | H04L 5/0078 |
| 2018/0302915 A1* | 10/2018 | Einhaus | H04W 72/0446 |
| 2019/0229859 A1* | 7/2019 | Manolakos | H04W 56/00 |

(Continued)

FOREIGN PATENT DOCUMENTS

| | | | | |
|---|---|---|---|---|
| CN | 112703810 A | * | 4/2021 | ......... H04L 5/0044 |
| CN | 113940120 A | * | 1/2022 | ............ H04W 76/28 |

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a base station may determine a minimum time gap for a set of uplink transmissions in a set of timing advance groups; and schedule a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission. Numerous other aspects are provided.

30 Claims, 5 Drawing Sheets

(56) References Cited

U.S. PATENT DOCUMENTS

| | | | |
|---|---|---|---|
| 2020/0015316 A1* | 1/2020 | Islam | H04W 56/0045 |
| 2020/0092861 A1* | 3/2020 | Xu | H04L 27/26025 |
| 2020/0169960 A1* | 5/2020 | Dinan | H04W 72/042 |
| 2020/0236715 A1* | 7/2020 | Akkarakaran | H04W 56/0045 |
| 2021/0014694 A1* | 1/2021 | Li | H04W 74/0808 |
| 2021/0243709 A1* | 8/2021 | Zhang | H04L 27/26025 |
| 2021/0368374 A1* | 11/2021 | Cheng | H04W 24/10 |
| 2022/0116898 A1* | 4/2022 | Ying | H04B 17/318 |

* cited by examiner

MINIMUM TIME GAP FOR UPLINK TRANSMISSION IN MULTIPLE TIMING ADVANCE GROUPS

CROSS-REFERENCE TO RELATED APPLICATION

This patent application claims priority to U.S. Provisional patent Application No. 62/968,654, filed on Jan. 31, 2020, entitled "MINIMUM TIME GAP FOR UPLINK TRANSMISSION IN MULTIPLE TIMING ADVANCE GROUPS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a minimum time gap for uplink transmission in multiple timing advance groups (TAGs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include determining a minimum time gap for a set of uplink transmissions in a set of timing advance groups; and scheduling a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, a method of wireless communication, performed by a user equipment, may include determining a minimum time gap for a set of uplink transmissions in a set of timing advance groups; and transmitting a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, a base station for wireless communication may include a memory and one or more processors operatively coupled to the memory. The memory and the one or more processors may be configured to determine a minimum time gap for a set of uplink transmissions in a set of timing advance groups; and schedule a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, a user equipment for wireless communication may include a memory and one or more processors operatively coupled to the memory. The memory and the one or more processors may be configured to determine a minimum time gap for a set of uplink transmissions in a set of timing advance groups; and transmit a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, a non-transitory computer-readable medium may store one or more instructions for wireless communication. The one or more instructions, when executed by one or more processors of a base station, may cause the one or more processors to determine a minimum time gap for a set of uplink transmissions in a set of timing advance groups; and schedule a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, a non-transitory computer-readable medium may store one or more instructions for wireless communication. The one or more instructions, when executed by one or more processors of a user equipment, may cause the one or more processors to determine a minimum time gap for a set of uplink transmissions in a set of timing advance groups; and transmit a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, an apparatus for wireless communication may include means for determining a minimum time gap for a set of uplink transmissions in a set of timing advance groups; and means for scheduling a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

In some aspects, an apparatus for wireless communication may include means for determining a minimum time gap for a set of uplink transmissions in a set of timing advance groups; and means for transmitting a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
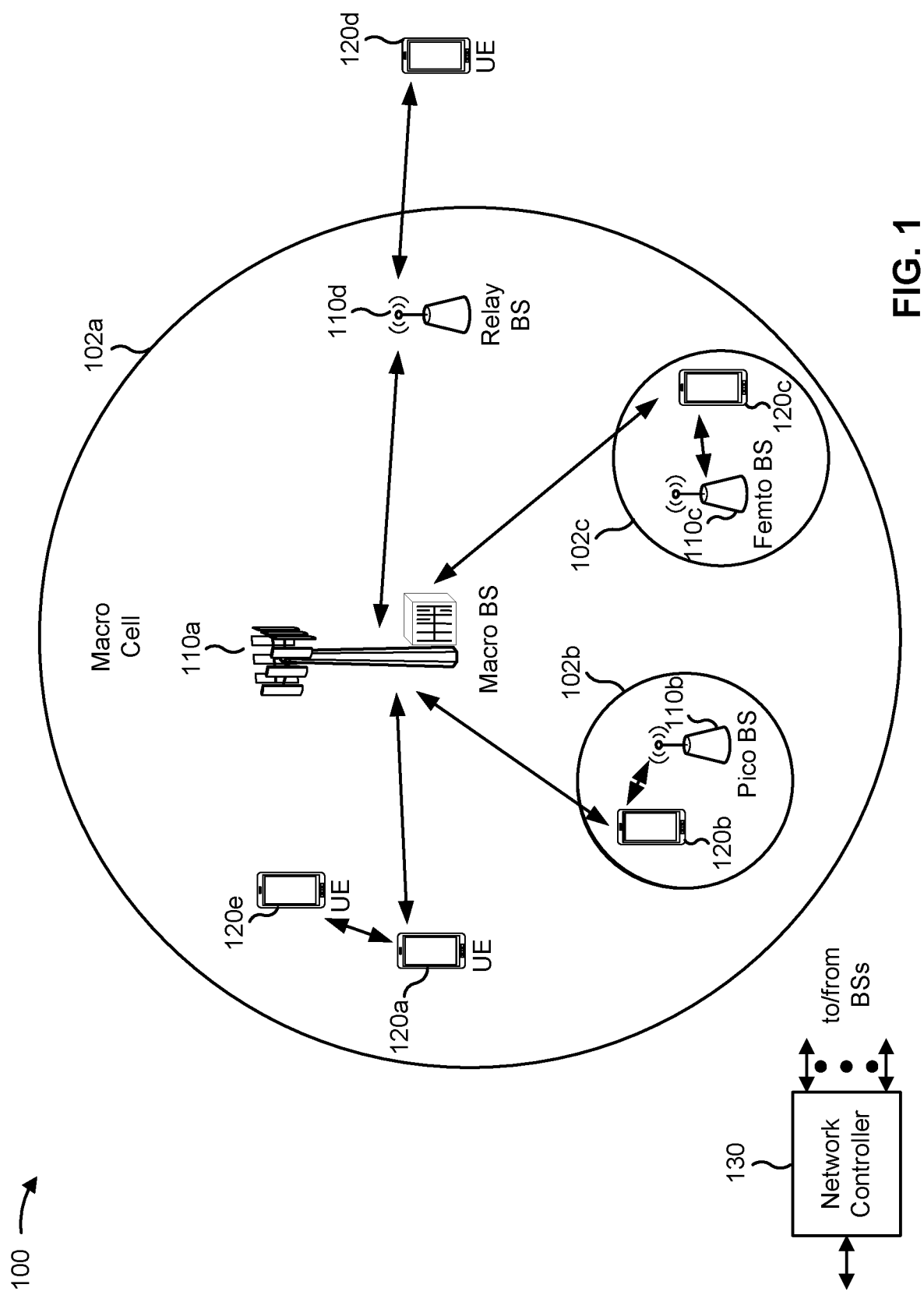
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
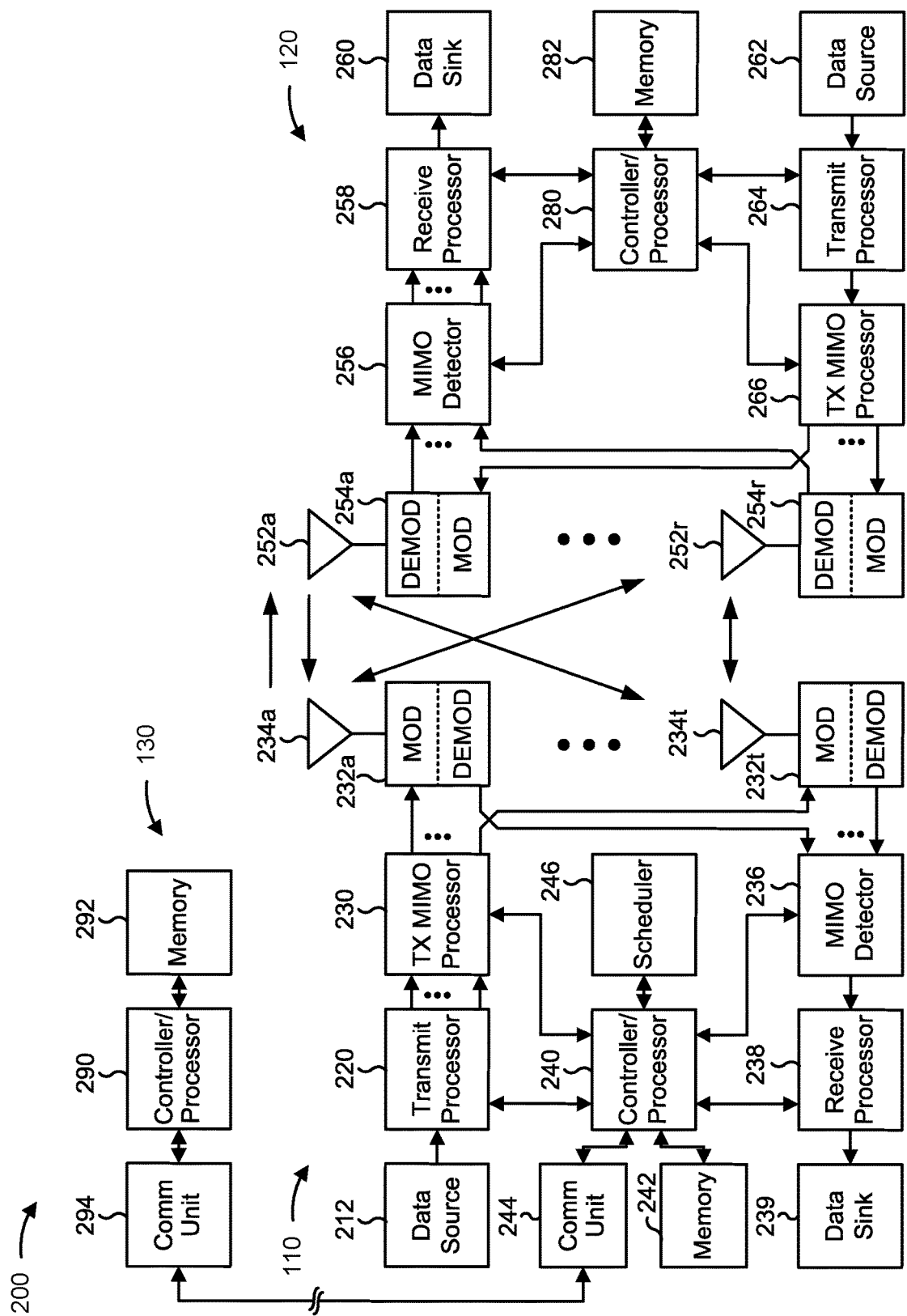
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a minimum time gap for uplink transmission in multiple timing advance groups (TAGs), as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for determining a minimum time gap for a set of uplink transmissions in a set of TAGs, means for transmitting a first uplink transmission, of the set of uplink transmissions, in a first TAG, of the set of TAGs, and a second uplink transmission, of the set of uplink transmissions, in a second TAG, of the set of TAGs, with at least the minimum time gap between the first uplink transmission and the second uplink transmission, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a minimum time gap for a set of uplink transmissions in a set of TAGs, means for scheduling a first uplink transmission, of the set of uplink transmissions, in a first TAG, of the set of TAGs, and a second uplink transmission, of the set of uplink transmissions, in a second TAG, of the set of TAGs, with at least the minimum time gap between the first uplink transmission and the second uplink transmission, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, a BS may provide a single serving cell via a plurality of remote radio heads. Each remote radio head may be associated with a different timing advance group (TAG) associated with a different timing for transmissions. For example, the BS may be associated with a first remote radio head in a first TAG and a second remote radio head in a second TAG. The BS (or another device associated with the serving cell) may provide a downlink control information (DCI) to a UE to schedule the UE for a plurality of repetitions of an uplink transmission. In beam sweeping deployments, the UE may be configured to beam sweep across a plurality of beams to transmit the plurality of repetitions of an uplink transmission, which may be termed a plurality of uplink transmissions. In some cases, the plurality of uplink transmissions may be scheduled for mini-slots within a slot. As a result, the UE may transmit a first uplink transmission to a first remote radio head using a first beam in a first mini-slot and may transmit a second uplink transmission to a second remote radio head using a second beam in a second mini-slot.

When switching between TAGs, the UE may alter a timing advance to enable a transition from synchronization with the first TAG to synchronization with the second TAG. However, when uplink transmissions are scheduled in a plurality of mini-slots, the UE may lack processing time to complete the transition. For example, the UE may fail to transmit to a second remote radio head in the second TAG after transmitting to a first remote radio head in a first TAG. Alternatively, the UE may transmit to the second remote radio head without synchronization (e.g., using the first TAG), which may result in a dropped communication, interference with other communications, and/or the like.

Some aspects described herein enable a minimum time gap for uplink transmissions in a plurality of TAGS. For example, the BS may determine a minimum time gap based at least in part on a specification, UE capability signaling, and/or the like and may schedule a plurality of uplink transmissions in accordance with the minimum time gap. In this case, the UE may transmit the plurality of uplink transmissions such that there is at least the minimum time gap between a first uplink transmission in a first TAG and a second uplink transmission in a second TAG. In this way, the BS and the UE may reduce a likelihood of dropped communications, interference with other communications, and/or the like.

Figure 3:
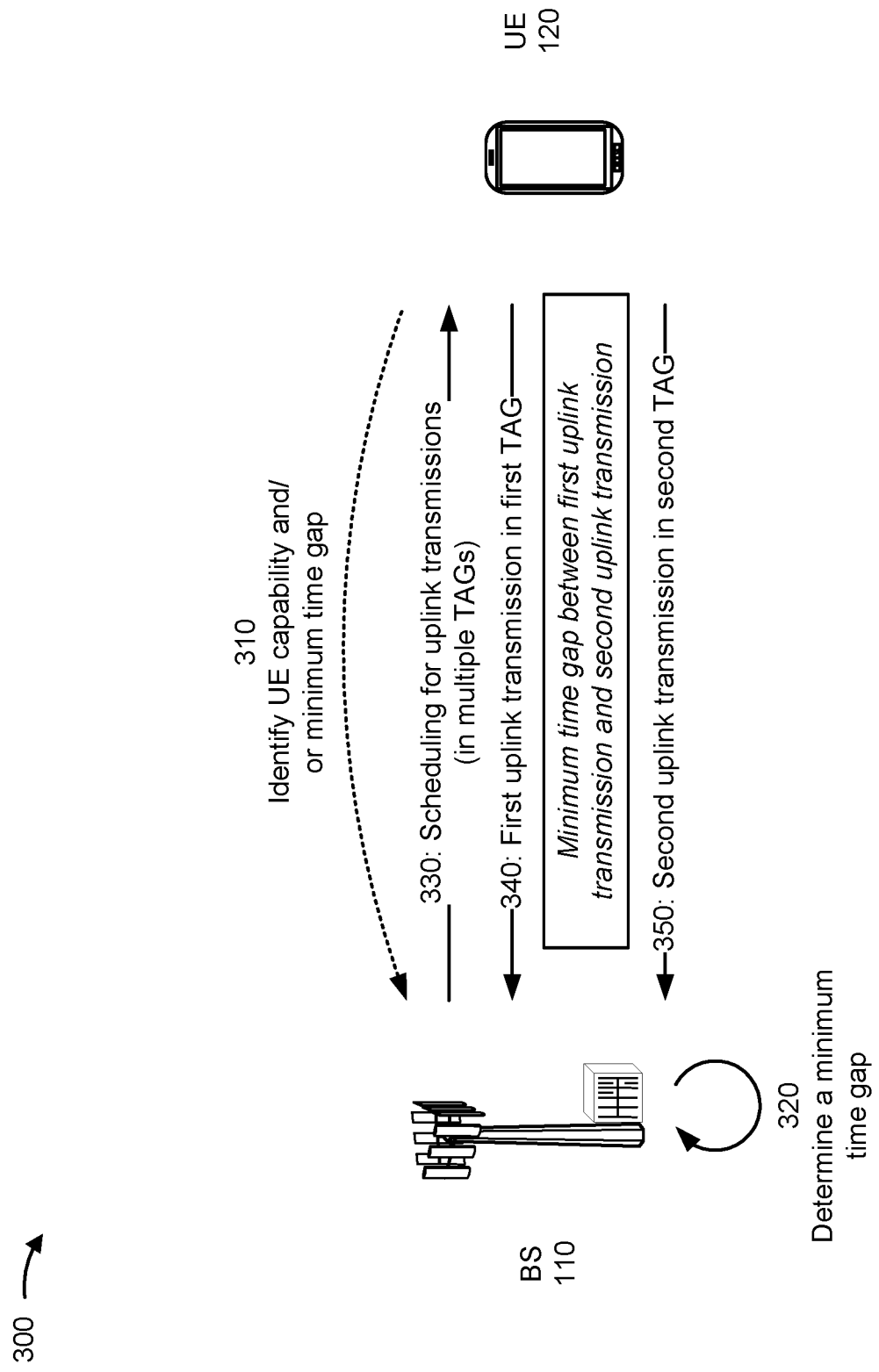
FIG. 3 is a diagram illustrating an example of a minimum time gap for uplink transmissions in multiple timing advance groups (TAGs), in accordance with various aspects of the present disclosure.

FIG. 3 is a diagram illustrating an example 300 of a minimum time gap for uplink transmission in multiple TAGs, in accordance with various aspects of the present disclosure. As shown in FIG. 3, example 300 includes a BS 110 (e.g., which may be associated with a plurality of remote radio heads associated with different TAGs) and a UE 120.

As further shown in FIG. 3, and by reference number 310, in some aspects, UE 120 may identify a UE capability and/or a minimum time gap to BS 110. For example, UE 120 may determine, as the minimum time gap, a processing time to switch from a first timing advance configuration associated with a first TAG to a second timing advance configuration associated with a second TAG. In this case, UE 120 may determine the minimum time gap as a quantity of symbols, a time period, a quantity of mini-slots, and/or the like.

In some aspects, UE 120 may determine the minimum time gap based at least in part on a numerology or subcarrier spacing of an uplink transmission. For example, UE 120 may determine the minimum time gap based at least in part on the numerology or subcarrier spacing of a first uplink transmission in a first TAG, a second uplink transmission in a second TAG, an uplink transmission (e.g., the first uplink transmission or the second uplink transmission) with a smallest numerology or subcarrier spacing, an uplink transmission with a largest numerology or subcarrier spacing, and/or the like.

In some aspects, UE 120 may determine the minimum time gap based at least in part on a numerology or subcarrier spacing of both the first uplink transmission and the second uplink transmission. For example, UE 120 may determine the minimum time gap based at least in part on a sum of a first time duration of the first uplink transmission (e.g., determined based at least in part on a numerology or subcarrier spacing) and a second time duration of the second uplink transmission (e.g., determined based at least in part on a numerology or subcarrier spacing).

In some aspects, UE 120 may determine the minimum time gap based at least in part on a numerology or subcarrier spacing of a set of uplink bandwidth parts. For example, UE 120 may determine the minimum time gap based at least in part on a numerology or subcarrier spacing of all uplink bandwidth parts of all component carriers of a particular TAG. In this case, the particular TAG may be the first TAG, the second TAG, a TAG (e.g., the first TAG or the second TAG) with a smallest minimum numerology or subcarrier spacing, a TAG with a largest minimum TAG or numerology, and/or the like. In other words, UE 120 may determine a minimum time gap that is a particular quantity of symbols with a subcarrier spacing that is a minimum subcarrier spacing among subcarrier spacings of all configured uplink bandwidth parts of all uplink carriers of, for example, the second TAG.

As further shown in FIG. 3, and by reference number 320, BS 110 may determine the minimum time gap. For example, BS 110 may determine the minimum time gap based at least in part on receiving signaling from the UE identifying the minimum time gap or a UE capability from which BS 110 may derive the minimum time gap, as described above. Additionally, or alternatively, BS 110 may determine the minimum time gap based at least in part on the minimum time gap being defined in a standard (e.g., based at least in part on information identifying the minimum time gap stored in a data structure). For example, BS 110 may identify the minimum time gap as a fixed quantity of symbols, a fixed quantity of time, a fixed quantity of mini-slots and/or the like.

In some aspects, BS 110 may determine the minimum time gap based at least in part on a numerology or subcarrier spacing of an uplink transmission. For example, BS 110, as described above with regard to UE 120, may determine the minimum time gap based at least in part on the numerology or subcarrier spacing of a first uplink transmission in a first TAG, a second uplink transmission in a second TAG, an uplink transmission with a smallest numerology or subcarrier spacing, an uplink transmission with a largest numerology or subcarrier spacing, and/or the like. Additionally, or alternatively, BS 110 may determine the minimum time gap based at least in part on a numerology or subcarrier spacing of both the first uplink transmission and the second uplink transmission. Additionally, or alternatively, BS 110 may determine the minimum time gap based at least in part on a numerology or subcarrier spacing of a set of uplink bandwidth parts. For example, UE 120 may determine the minimum time gap based at least in part on a numerology or subcarrier spacing of all uplink bandwidth parts of all component carriers of a particular TAG, such as the first TAG, the second TAG, a TAG with a smallest minimum numerology or subcarrier spacing, a TAG with a largest minimum TAG or numerology, and/or the like.

As further shown in FIG. 3, and by reference number 330, BS 110 may schedule uplink transmissions for UE 120 in a plurality of TAGs. For example, BS 110 may schedule a first uplink transmission in a first TAG (e.g., for UE 120 to communicate with a first remote radio head of BS 110), a second uplink transmission in a second TAG (e.g., for UE 120 to communicate with a second remote radio head of BS 110), and/or the like. In this case, BS 110 may schedule a gap between the first uplink transmission and the second uplink transmission for at least the minimum time gap. In some aspects, BS 110 may transmit a DCI to schedule the uplink transmissions. For example, BS 110 may transmit one or more DCIs identifying a set of uplink transmissions in a set of TAGs with at least the minimum time gap between consecutive uplink transmissions in different TAGs.

As further shown in FIG. 3, and by reference number 340, UE 120 may transmit a first uplink transmission in a first TAG. For example, UE 120 may transmit the first uplink transmission in the first TAG. In this case, UE 120, based at least in part on scheduling from BS 110, may transition to a different timing advance configuration associated with the second TAG during a delay period of at least the minimum time gap. As shown by reference number 350, after transitioning to the different timing advance configuration and after at least the minimum time gap, UE 120 may transmit the second uplink transmission in the second TAG.

As indicated above, FIG. 3 is provided as an example. Other examples may differ from what is described with respect to FIG. 3.

Figure 4:
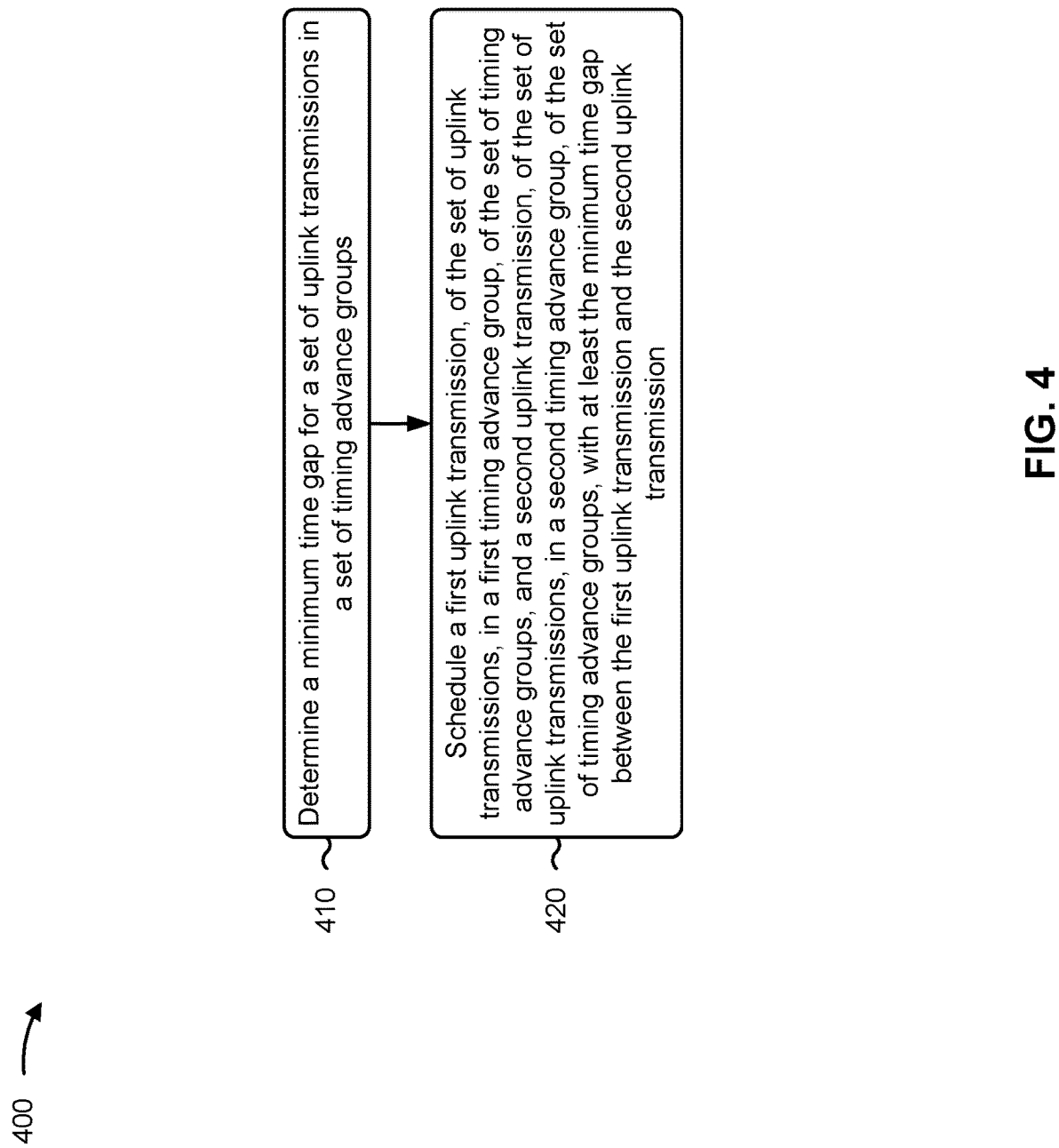
FIG. 4 is a diagram illustrating an example process performed, for example, by a base station, in accordance with various aspects of the present disclosure.

FIG. 4 is a diagram illustrating an example process 400 performed, for example, by a base station, in accordance with various aspects of the present disclosure. Example process 400 is an example where the base station (e.g., base station 110 and/or the like) performs operations associated with a minimum time gap for uplink transmission in multiple timing advance groups.

As shown in FIG. 4, in some aspects, process 400 may include determining a minimum time gap for a set of uplink transmissions in a set of timing advance groups (block 410). For example, the base station (e.g., using transmit processor 220, receive processor 238, controller/processor 240, memory 242, and/or the like) may determine a minimum time gap for a set of uplink transmissions in a set of timing advance groups, as described above.

As further shown in FIG. 4, in some aspects, process 400 may include scheduling a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission (block 420). For example, the base station (e.g., using transmit processor 220, receive processor 238, controller/processor 240, memory 242, and/or the like) may schedule a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission, as described above.

Process 400 may include additional aspects, such as any single aspect or any combination of aspects described below and/or in connection with one or more other processes described elsewhere herein.

In a first aspect, the minimum time gap is a fixed time gap defined by a specification.

In a second aspect, alone or in combination with the first aspect, the minimum time gap is a fixed quantity of symbols and is based at least in part on a numerology or a subcarrier spacing of a single uplink transmission of the set of uplink transmissions.

In a third aspect, alone or in combination with one or more of the first and second aspects, the single uplink transmission is one of: the first uplink transmission, the second uplink transmission, an uplink transmission with a smallest numerology or subcarrier spacing, an uplink transmission with a largest numerology or subcarrier spacing.

In a fourth aspect, alone or in combination with one or more of the first through third aspects, the minimum time gap is a fixed quantity of symbols and is based at least in part on a numerology or a subcarrier spacing of the first uplink transmission and the second uplink transmission.

In a fifth aspect, alone or in combination with one or more of the first through fourth aspects, the minimum time gap is a fixed quantity of symbols and is based at least in part on a numerology or a subcarrier spacing of a set of uplink bandwidth parts of a set of component carriers of a single timing advance group of the set of timing advance groups.

In a sixth aspect, alone or in combination with one or more of the first through fifth aspects, the single timing advance group is one of the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

In a seventh aspect, alone or in combination with one or more of the first through sixth aspects, the minimum time gap is a user equipment reported time gap based at least in part on a user equipment capability of a user equipment for which the first uplink transmission and the second uplink transmission are scheduled.

In an eighth aspect, alone or in combination with one or more of the first through seventh aspects, process 400 includes receiving, from the user equipment, information identifying the minimum time gap.

In a ninth aspect, alone or in combination with one or more of the first through eighth aspects, the minimum time gap is based at least in part on the user equipment reported time gap and a numerology or a subcarrier spacing of a single uplink transmission of the set of uplink transmissions.

In a tenth aspect, alone or in combination with one or more of the first through ninth aspects, the single uplink transmission is one of the first uplink transmission, the second uplink transmission, an uplink transmission with a smallest numerology or subcarrier spacing, an uplink transmission with a largest numerology or subcarrier spacing.

In an eleventh aspect, alone or in combination with one or more of the first through tenth aspects, the minimum time gap is based at least in part on the user equipment reported time gap and is based at least in part on a numerology or a subcarrier spacing of the first uplink transmission and the second uplink transmission.

In a twelfth aspect, alone or in combination with one or more of the first through eleventh aspects, the minimum time gap is based at least in part on the user equipment reported time gap and is based at least in part on a numerology or a subcarrier spacing of a set of uplink bandwidth parts of a set of component carriers of a single timing advance group of the set of timing advance groups.

In a thirteenth aspect, alone or in combination with one or more of the first through twelfth aspects, the single timing advance group is one of the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
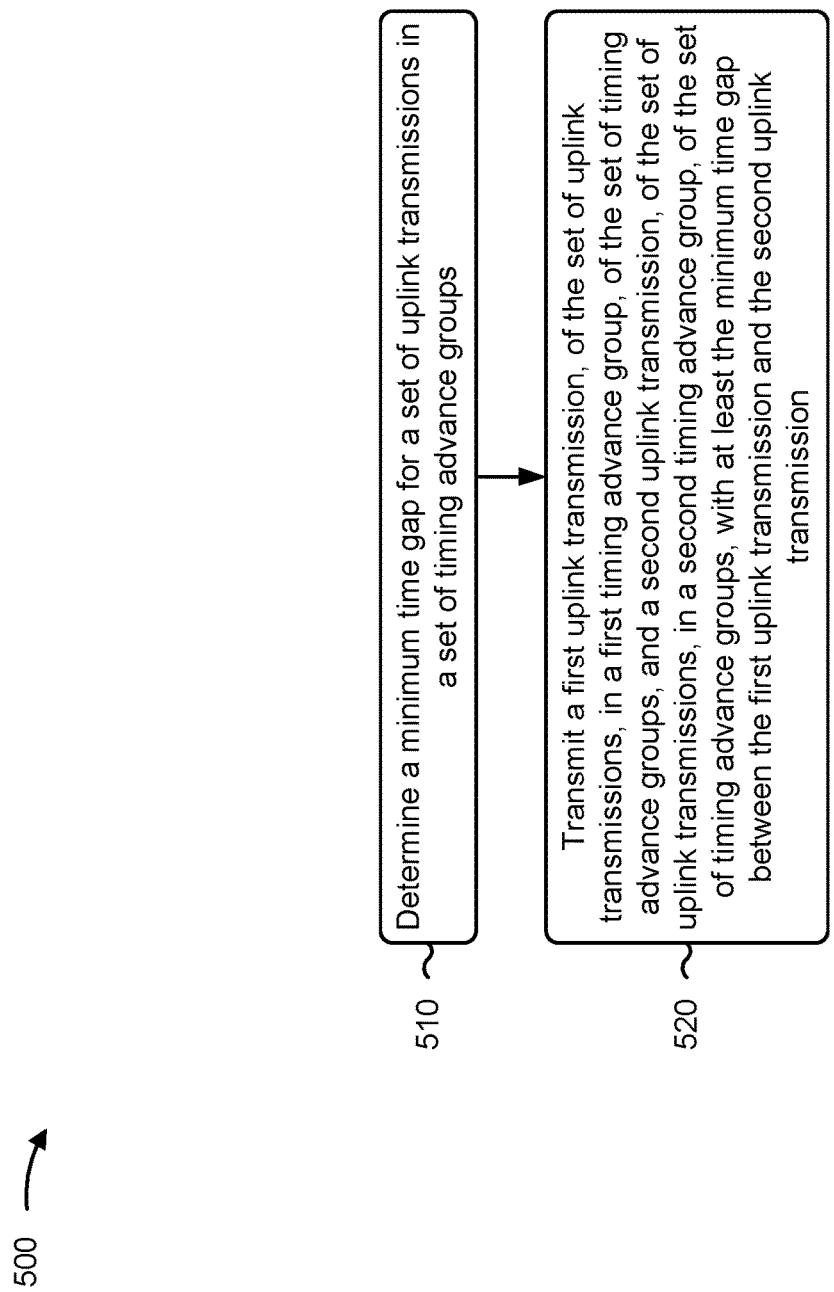
FIG. 5 is a diagram illustrating an example process performed, for example, by a user equipment, in accordance with various aspects of the present disclosure.

FIG. 5 is a diagram illustrating an example process 500 performed, for example, by a user equipment, in accordance with various aspects of the present disclosure. Example process 500 is an example where the user equipment (e.g., user equipment 120 and/or the like) performs operations associated with a minimum time gap for uplink transmission in multiple timing advance groups.

As shown in FIG. 5, in some aspects, process 500 may include determining a minimum time gap for a set of uplink transmissions in a set of timing advance groups (block 510). For example, the user equipment (e.g., using receive processor 258, transmit processor 264, controller/processor 280, memory 282, and/or the like) may determine a minimum time gap for a set of uplink transmissions in a set of timing advance groups, as described above.

As further shown in FIG. 5, in some aspects, process 500 may include transmitting a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission (block 520). For example, the user equipment (e.g., using receive processor 258, transmit processor 264, controller/processor 280, memory 282, and/or the like) may transmit a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission, as described above.

Process 500 may include additional aspects, such as any single aspect or any combination of aspects described below and/or in connection with one or more other processes described elsewhere herein.

In a first aspect, determining the minimum time gap includes receiving, from a base station, at least one of: information identifying the minimum time gap or information identifying a schedule for the first uplink transmission and the second uplink transmission.

In a second aspect, alone or in combination with the first aspect, the minimum time gap is a fixed time gap defined by a specification.

In a third aspect, alone or in combination with one or more of the first and second aspects, the minimum time gap is a fixed quantity of symbols and is based at least in part on a numerology or a subcarrier spacing of a single uplink transmission of the set of uplink transmissions.

In a fourth aspect, alone or in combination with one or more of the first through third aspects, the single uplink transmission is one of the first uplink transmission, the second uplink transmission, an uplink transmission with a smallest numerology or subcarrier spacing, an uplink transmission with a largest numerology or subcarrier spacing.

In a fifth aspect, alone or in combination with one or more of the first through fourth aspects, the minimum time gap is a fixed quantity of symbols and is based at least in part on a numerology or a subcarrier spacing of the first uplink transmission and the second uplink transmission.

In a sixth aspect, alone or in combination with one or more of the first through fifth aspects, the minimum time gap is a fixed quantity of symbols and is based at least in part on a numerology or a subcarrier spacing of a set of uplink bandwidth parts of a set of component carriers of a single timing advance group of the set of timing advance groups.

In a seventh aspect, alone or in combination with one or more of the first through sixth aspects, the single timing advance group is one of the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

In an eighth aspect, alone or in combination with one or more of the first through seventh aspects, the minimum time gap is a user equipment reported time gap based at least in part on a user equipment capability of the user equipment.

In a ninth aspect, alone or in combination with one or more of the first through eighth aspects, process 500 includes transmitting, to a base station, information identifying the minimum time gap based at least in part on determining the minimum time gap.

In a tenth aspect, alone or in combination with one or more of the first through ninth aspects, the minimum time gap is based at least in part on the user equipment reported time gap and a numerology or a subcarrier spacing of a single uplink transmission of the set of uplink transmissions.

In an eleventh aspect, alone or in combination with one or more of the first through tenth aspects, the single uplink transmission is one of: the first uplink transmission, the second uplink transmission, an uplink transmission with a smallest numerology or subcarrier spacing, an uplink transmission with a largest numerology or subcarrier spacing.

In a twelfth aspect, alone or in combination with one or more of the first through eleventh aspects, the minimum time gap is based at least in part on the user equipment reported time gap and is based at least in part on a numerology or a subcarrier spacing of the first uplink transmission and the second uplink transmission.

In a thirteenth aspect, alone or in combination with one or more of the first through twelfth aspects, the minimum time gap is based at least in part on the user equipment reported time gap and is based at least in part on a numerology or a subcarrier spacing of a set of uplink bandwidth parts of a set of component carriers of a single timing advance group of the set of timing advance groups.

In a fourteenth aspect, alone or in combination with one or more of the first through thirteenth aspects, the single timing advance group is one of the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a base station, comprising: determining a minimum time gap for a set of uplink transmissions in a set of timing advance groups; and scheduling a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

Aspect 2: The method of aspect 1, wherein the minimum time gap is a fixed time gap defined by a specification.

Aspect 3: The method of aspect 2, wherein the minimum time gap is a fixed quantity of symbols and is based at least in part on a numerology or a subcarrier spacing of a single uplink transmission of the set of uplink transmissions.

Aspect 4: The method of aspect 3, wherein the single uplink transmission is one of: the first uplink transmission, the second uplink transmission, an uplink transmission with a smallest numerology or subcarrier spacing, an uplink transmission with a largest numerology or subcarrier spacing.

Aspect 5: The method of any of aspects 2 to 4, wherein the minimum time gap is a fixed quantity of symbols and is based at least in part on a numerology or a subcarrier spacing of the first uplink transmission and the second uplink transmission.

Aspect 6: The method of any of aspects 2 to 5, wherein the minimum time gap is a fixed quantity of symbols and is based at least in part on a numerology or a subcarrier spacing of a set of uplink bandwidth parts of a set of component carriers of a single timing advance group of the set of timing advance groups.

Aspect 7: The method of aspect 6, wherein the single timing advance group is one of: the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

Aspect 8: The method of any of aspects 1 to 7, wherein the minimum time gap is a user equipment reported time gap based at least in part on a user equipment capability of a user equipment for which the first uplink transmission and the second uplink transmission are scheduled.

Aspect 9: The method of aspect 8, further comprising: receiving, from the user equipment, information identifying the minimum time gap.

Aspect 10: The method of any of aspects 8 to 9, wherein the minimum time gap is based at least in part on the user equipment reported time gap and a numerology or a subcarrier spacing of a single uplink transmission of the set of uplink transmissions.

Aspect 11: The method of aspect 10, wherein the single uplink transmission is one of: the first uplink transmission, the second uplink transmission, an uplink transmission with a smallest numerology or subcarrier spacing, an uplink transmission with a largest numerology or subcarrier spacing.

Aspect 12: The method of any of aspects 8 to 11, wherein the minimum time gap is based at least in part on the user equipment reported time gap and is based at least in part on a numerology or a subcarrier spacing of the first uplink transmission and the second uplink transmission.

Aspect 13: The method of any of aspects 8 to 12, wherein the minimum time gap is based at least in part on the user equipment reported time gap and is based at least in part on a numerology or a subcarrier spacing of a set of uplink bandwidth parts of a set of component carriers of a single timing advance group of the set of timing advance groups.

Aspect 14: The method of aspect 13, wherein the single timing advance group is one of: the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

Aspect 15: A method of wireless communication performed by a user equipment, comprising: determining a minimum time gap for a set of uplink transmissions in a set of timing advance groups; and transmitting a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

Aspect 16: The method of aspect 15, wherein determining the minimum time gap comprises: receiving, from a base station, at least one of: information identifying the minimum time gap or information identifying a schedule for the first uplink transmission and the second uplink transmission.

Aspect 17: The method of any of aspects 15 to 16, wherein the minimum time gap is a fixed time gap defined by a specification.

Aspect 18: The method of aspect 17, wherein the minimum time gap is a fixed quantity of symbols and is based at least in part on a numerology or a subcarrier spacing of a single uplink transmission of the set of uplink transmissions.

Aspect 19: The method of aspect 18, wherein the single uplink transmission is one of: the first uplink transmission, the second uplink transmission, an uplink transmission with a smallest numerology or subcarrier spacing, an uplink transmission with a largest numerology or subcarrier spacing.

Aspect 20: The method of any of aspects 15 to 19, wherein the minimum time gap is a fixed quantity of symbols and is based at least in part on a numerology or a subcarrier spacing of the first uplink transmission and the second uplink transmission.

Aspect 21: The method of any of aspects 15 to 20, wherein the minimum time gap is a fixed quantity of symbols and is based at least in part on a numerology or a subcarrier spacing of a set of uplink bandwidth parts of a set of component carriers of a single timing advance group of the set of timing advance groups.

Aspect 22: The method of aspect 21, wherein the single timing advance group is one of: the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

Aspect 23: The method of any of aspects 15 to 22, wherein the minimum time gap is a user equipment reported time gap based at least in part on a user equipment capability of the user equipment.

Aspect 24: The method of aspect 23, further comprising: transmitting, to a base station, information identifying the minimum time gap based at least in part on determining the minimum time gap.

Aspect 25: The method of any of aspects 23 to 24, wherein the minimum time gap is based at least in part on the user equipment reported time gap and a numerology or a subcarrier spacing of a single uplink transmission of the set of uplink transmissions.

Aspect 26: The method of aspect 25, wherein the single uplink transmission is one of: the first uplink transmission, the second uplink transmission, an uplink transmission with a smallest numerology or subcarrier spacing, an uplink transmission with a largest numerology or subcarrier spacing.

Aspect 27: The method of any of aspects 23 to 26, wherein the minimum time gap is based at least in part on the user equipment reported time gap and is based at least in part on a numerology or a subcarrier spacing of the first uplink transmission and the second uplink transmission.

Aspect 28: The method of any of aspects 23 to 27, wherein the minimum time gap is based at least in part on the user equipment reported time gap and is based at least in part on a numerology or a subcarrier spacing of a set of uplink bandwidth parts of a set of component carriers of a single timing advance group of the set of timing advance groups.

Aspect 29: The method of aspect 28, wherein the single timing advance group is one of: the first timing advance group, the second timing advance group, a particular timing advance group, of the set of timing advance groups, with a smallest numerology or subcarrier spacing, or a particular timing advance group, of the set of timing advance groups, with a largest numerology or subcarrier spacing.

Aspect 30: An apparatus for wireless communication at a device, comprising a processor; memory coupled with the processor; and instructions stored in the memory and executable by the processor to cause the apparatus to perform the method of one or more aspects of aspects 1-14.

Aspect 31: A device for wireless communication, comprising a memory and one or more processors coupled to the memory, the memory and the one or more processors configured to perform the method of one or more aspects of aspects 1-14.

Aspect 32: An apparatus for wireless communication, comprising at least one means for performing the method of one or more aspects of aspects 1-14.

Aspect 33: A non-transitory computer-readable medium storing code for wireless communication, the code comprising instructions executable by a processor to perform the method of one or more aspects of aspects 1-14.

Aspect 34: A non-transitory computer-readable medium storing a set of instructions for wireless communication, the set of instructions comprising one or more instructions that, when executed by one or more processors of a device, cause the device to perform the method of one or more aspects of aspects 1-14.

Aspect 35: An apparatus for wireless communication at a device, comprising a processor; memory coupled with the processor; and instructions stored in the memory and executable by the processor to cause the apparatus to perform the method of one or more aspects of aspects 15-29.

Aspect 36: A device for wireless communication, comprising a memory and one or more processors coupled to the memory, the memory and the one or more processors configured to perform the method of one or more aspects of aspects 15-29.

Aspect 37: An apparatus for wireless communication, comprising at least one means for performing the method of one or more aspects of aspects 15-29.

Aspect 38: A non-transitory computer-readable medium storing code for wireless communication, the code comprising instructions executable by a processor to perform the method of one or more aspects of aspects 15-29.

Aspect 39: A non-transitory computer-readable medium storing a set of instructions for wireless communication, the set of instructions comprising one or more instructions that, when executed by one or more processors of a device, cause the device to perform the method of one or more aspects of aspects 15-29.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment for wireless communication, comprising:
a memory; and
one or more processors coupled to the memory, the one or more processors configured to cause the user equipment to:
determine a minimum time gap for a set of uplink transmissions corresponding to a set of timing advance groups, wherein the minimum time gap is based at least on switching timing advance configurations associated with the set of timing advance groups; and
transmit a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

2. The user equipment of claim 1, wherein the one or more processors, when determining the minimum time gap, are configured to cause the user equipment to:
receive, from a network entity, at least one of: information identifying the minimum time gap or information identifying a schedule for the first uplink transmission and the second uplink transmission.

3. The user equipment of claim 1, wherein the minimum time gap is a fixed time gap defined by a specification.

4. The user equipment of claim 3, wherein the minimum time gap is a fixed quantity of symbols, wherein the minimum time gap is based at least on a numerology or a subcarrier spacing of a single uplink transmission of the set of uplink transmissions.

5. The user equipment of claim 4, wherein the single uplink transmission is one of: the first uplink transmission, the second uplink transmission, an uplink transmission with a smallest numerology or subcarrier spacing, an uplink transmission with a largest numerology or subcarrier spacing.

6. The user equipment of claim 3, wherein the minimum time gap is a fixed quantity of symbols, wherein the minimum time gap is based at least on a numerology or a subcarrier spacing of the first uplink transmission and the second uplink transmission.

7. The user equipment of claim 3, wherein the minimum time gap is a fixed quantity of symbols, wherein the minimum time gap is based at least on a numerology or a subcarrier spacing of a set of uplink bandwidth parts of a set of component carriers of a single timing advance group of the set of timing advance groups.

8. The user equipment of claim 7, wherein the single timing advance group is one of:
the first timing advance group,
the second timing advance group,
a particular timing advance group, of the set of timing advance groups, with a smallest numerology or subcarrier spacing, or
a particular timing advance group, of the set of timing advance groups, with a largest numerology or subcarrier spacing.

9. The user equipment of claim 1, wherein the minimum time gap is a user equipment reported time gap, wherein the user equipment reported time gap is based at least on a user equipment capability of the user equipment.

10. The user equipment of claim 9, wherein the one or more processors are further configured to cause the user equipment to:
transmit, to a network entity, information identifying the minimum time gap, wherein the information identifying the minimum time gap is based at least on determining the minimum time gap.

11. The user equipment of claim 9, wherein the minimum time gap is based at least in part on the user equipment reported time gap, and wherein the minimum time gap is based at least on a numerology or a subcarrier spacing of a single uplink transmission of the set of uplink transmissions.

12. The user equipment of claim 11, wherein the single uplink transmission is one of: the first uplink transmission, the second uplink transmission, an uplink transmission with a smallest numerology or subcarrier spacing, an uplink transmission with a largest numerology or subcarrier spacing.

13. The user equipment of claim 9, wherein the minimum time gap is based at least in part on the user equipment reported time gap, and wherein the minimum time gap is based at least on a numerology or a subcarrier spacing of the first uplink transmission and the second uplink transmission.

14. The user equipment of claim 9, wherein the minimum time gap is based at least in part on the user equipment reported time gap, and wherein the minimum time gap is based at least in a numerology or a subcarrier spacing of a set of uplink bandwidth parts of a set of component carriers of a single timing advance group of the set of timing advance groups.

15. The user equipment of claim 14, wherein the single timing advance group is one of:
the first timing advance group,
the second timing advance group,
a particular timing advance group, of the set of timing advance groups, with a smallest numerology or subcarrier spacing, or
a particular timing advance group, of the set of timing advance groups, with a largest numerology or subcarrier spacing.

16. A network entity for wireless communication, comprising:
a memory; and
one or more processors coupled to the memory, the one or more processors configured to cause the network entity to:
determine a minimum time gap for a set of uplink transmissions corresponding to a set of timing advance groups, wherein the minimum time gap is based at least in switching timing advance configurations associated with the set of timing advance groups; and
schedule a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

17. The network entity of claim 16, wherein the minimum time gap is a fixed time gap defined by a specification.

18. The network entity of claim 17, wherein the minimum time gap is a fixed quantity of symbols, wherein the minimum time gap is based at least in a numerology or a subcarrier spacing of a single uplink transmission of the set of uplink transmissions.

19. The network entity of claim 18, wherein the single uplink transmission is one of: the first uplink transmission, the second uplink transmission, an uplink transmission with a smallest numerology or subcarrier spacing, an uplink transmission with a largest numerology or subcarrier spacing.

20. The network entity of claim 17, wherein the minimum time gap is a fixed quantity of symbols, wherein the minimum time gap is based at least on a numerology or a subcarrier spacing of the first uplink transmission and the second uplink transmission.

21. The network entity of claim 17, wherein the minimum time gap is a fixed quantity of symbols, wherein the minimum time gap is based at least on a numerology or a subcarrier spacing of a set of uplink bandwidth parts of a set of component carriers of a single timing advance group of the set of timing advance groups.

22. The network entity of claim 21, wherein the single timing advance group is one of:
the first timing advance group,
the second timing advance group,
a particular timing advance group, of the set of timing advance groups, with a smallest numerology or subcarrier spacing, or
a particular timing advance group, of the set of timing advance groups, with a largest numerology or subcarrier spacing.

23. The network entity of claim 16, wherein the minimum time gap is a user equipment reported time gap, wherein the user equipment reported time gap is based at least on a user equipment capability of a user equipment for which the first uplink transmission and the second uplink transmission are scheduled.

24. The network entity of claim 23, wherein the one or more processors are further configured to cause the network entity to:
receive, from the user equipment, information identifying the minimum time gap.

25. The network entity of claim 23, wherein the minimum time gap is based at least in part on the user equipment reported time gap and wherein the minimum time gap is based at least on a numerology or a subcarrier spacing of a single uplink transmission of the set of uplink transmissions.

26. The network entity of claim 25, wherein the single uplink transmission is one of: the first uplink transmission, the second uplink transmission, an uplink transmission with a smallest numerology or subcarrier spacing, an uplink transmission with a largest numerology or subcarrier spacing.

27. The network entity of claim 23, wherein the minimum time gap is based at least in part on the user equipment reported time gap, and wherein the minimum time gap is based at least in a numerology or a subcarrier spacing of the first uplink transmission and the second uplink transmission.

28. The network entity of claim 23, wherein the minimum time gap is based at least in part on the user equipment reported time gap, and wherein the minimum time gap is based at least in a numerology or a subcarrier spacing of a set of uplink bandwidth parts of a set of component carriers of a single timing advance group of the set of timing advance groups.

29. A method of wireless communication performed by a user equipment, comprising:
determining a minimum time gap for a set of uplink transmissions corresponding to a set of timing advance groups, wherein the minimum time gap is based at least in switching timing advance configurations associated with the set of timing advance groups; and
transmitting a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

30. A method of wireless communication performed by a network entity, comprising:
determining a minimum time gap for a set of uplink transmissions corresponding to a set of timing advance groups, wherein the minimum time gap is based at least on switching timing advance configurations associated with the set of timing advance groups; and
scheduling a first uplink transmission, of the set of uplink transmissions, in a first timing advance group, of the set of timing advance groups, and a second uplink transmission, of the set of uplink transmissions, in a second timing advance group, of the set of timing advance groups, with at least the minimum time gap between the first uplink transmission and the second uplink transmission.

* * * * *